Jan. 12, 1932.  W. BEUSCH  1,841,003
REGISTERING APPARATUS
Filed April 7, 1926  2 Sheets-Sheet 1
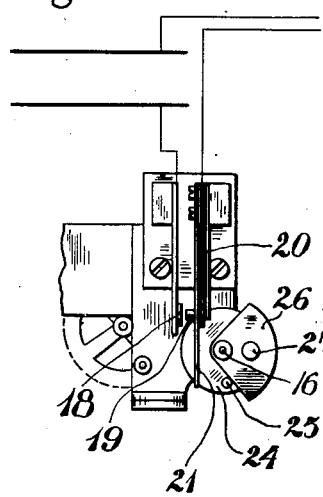
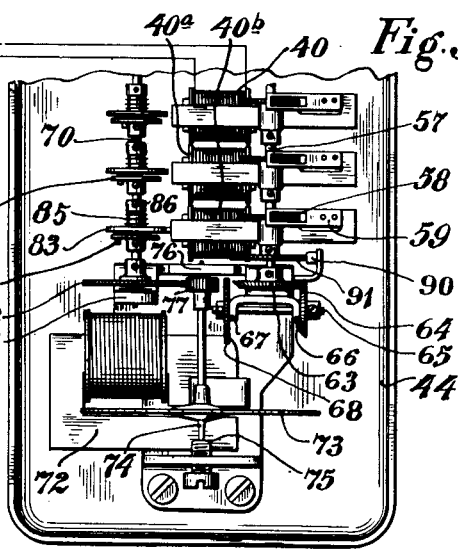
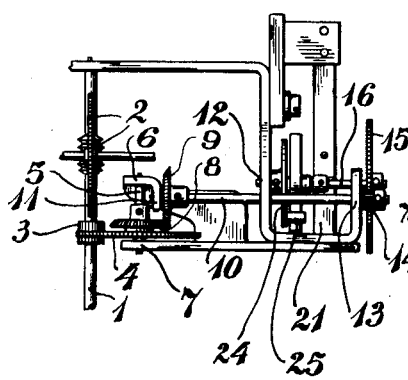
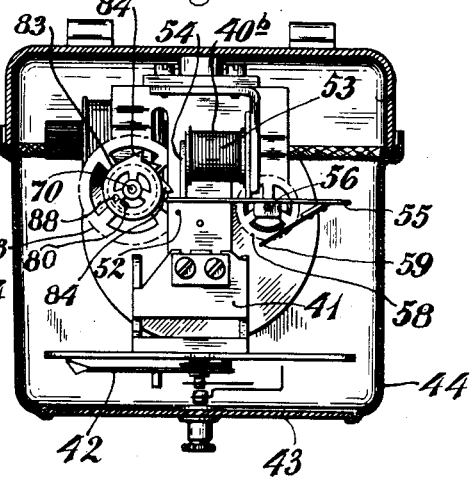
Inventor:
Willi Beusch
By John D Morgan
Attorney Patented Jan. 12, 1932

1,841,003

UNITED STATES PATENT OFFICE

WILLI BEUSCH, OF ZUG, SWITZERLAND

REGISTERING APPARATUS

Application filed April 7, 1926, Serial No. 100,222, and in Switzerland April 9, 1925.

The invention relates to a novel and useful apparatus for making an additional or ultimate indication from a meter, or other registering device, and for making a totalized registration or indication for a plurality of meters or other registering devices, and in some of its aspects for making such indications at a distance from the original meter or meters, or other recording or registering device or devices.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a fragmentary side elevation of a device embodying the invention and applied exemplarily to an electric meter;

Fig. 2 is an end elevation corresponding to Fig. 1;

Fig. 3 is an elevation of an embodiment of the ultimate, or totalizing or distant registering device;

Fig. 4 is a top plan corresponding to Fig. 3; and

Figure 5:
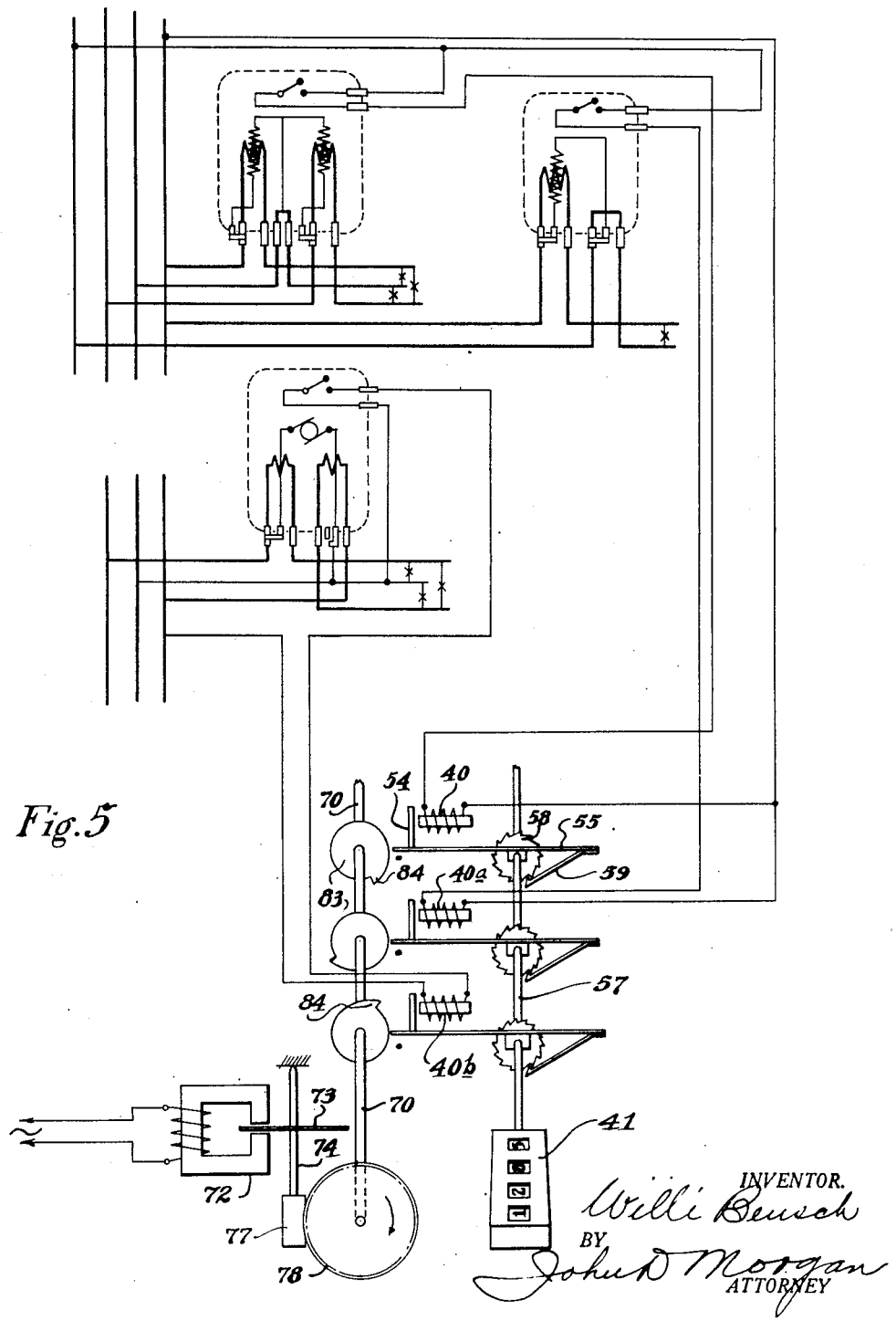
Fig. 5 is a diagrammatic showing including the main features of the mechanism of the preceding figures.

The invention in its broader aspects is applicable to the totalization, or to the distant recording or registering, or to both combined, of either one or a plurality of metering or registering devices of widely various kinds, as for instance gas or water meters, but in the exemplary embodiment it is shown applied to the distant totalization of a plurality of electric meters, of any known or suitable forms.

In the present preferred embodiment the control of the independent recording or registering means, whether it be near or distant, and whether a totalizing registration or merely an additional registration, is effected through the control of an electric circuit, which is made and broken in predetermined relation to the movement or other computing function of the original metering or registering device.

An important feature and advantage of the present invention is that in making a totalizing indication from a plurality of original meters, means are provided whereby the making of the total or other second indication or registration by one original meter will not interfere with or nullify the similar action or function by another original meter. With this function in view, the totalizing or other ultimate registering mechanism is provided with separate and independently-operated mechanisms which are set, respectively, by each of the original metering devices, and with devices whereby said mechanism after being so set will operate sequentially and independently to effect the ultimate indication or registration, irrespective of the timing or lack of timing of the various original meters.

In the present preferred embodiment this is effected by having the various circuits coming from, and controlled by, the respective original meters to set the readings from those respective meters whenever they occur during the operation of said original meters, but the totalizing or other ultimate registration from the various original meters is effected sequentially and in this respect independently of the setting by the original meters.

In explaining the invention but one original metering device will be described, but it will be understood that any desired number may be employed, and these may be of different frequencies, current and voltage ratings, or may vary in other respects.

Referring now in detail to the embodiment of the invention, illustrated by way of example in the accompanying drawings, the control or actuating means at the original meter is shown applied to an electric meter (a few parts only of the meter being shown) and as being optionally or preferably driven from the meter disc shaft. The meter disc shaft 1 is shown having worm and worm-wheel gearing connections 2 to the usual registering mechanism (not shown); and in addition thereto, gear connections for controlling an electrical circuit, which in turn governs the ultimate registering device in predetermined relation to the rotations of the meter disc shaft 1.

As embodied, a pinion 3 is fixed on meter disc shaft 1, and meshes with a gear wheel 4, fixed on a shaft 5, which shaft is journaled in bearings 6 and 7 in the frame structure. A beveled gear 8 is likewise fixed on shaft 5, and meshes with a bevel gear 9, fixed on shaft 10, which shaft is journaled at 11, 12 and 13 in the machine frame. Fixed on shaft 10 is a pinion 14, which meshes with a gear wheel 15, fixed on a shaft 16, likewise journaled in the frame parallel to the shaft 10.

The controlling circuit for the ultimate registering mechanism comprises a contact, which is closed by suitable means from the mechanism just described. One contact terminal 18 is preferably stationary, and the other contact comprises a pin 19, mounted on a spring member 20, which is impelled to circuit-closing position. A spring member 21, operates to resiliently hold the members 19 and 20 away from circuit-closing position.

Means are provided, mounted on the shaft 16, and therefore operating in periodic relation to the meter disc shaft 1, for closing the circuit at 18 and 19. In the embodied form of said means, a disc 24 is fixed on shaft 16, and a pin 25 is fixed to and projects from the side face of the disc 24. Loosely mounted on shaft 16 is a contact-closing plate 26, having a pin 27 projecting from the side face thereof.

During the rotation of the mechanism, assuming the position of Fig. 1, the contact-closing plate 26 rests against the pin 25 and is carried angularly about the shaft 16. When the center of gravity of plate 26 passes over the shaft 16, the plate drops immediately of its own weight and pushes spring 21 to the left in Fig. 1, and thus permits spring 20 to momentarily close the actuating and controlling circuit for the ultimate indicating or registering means.

The ultimate indicating or registering means, as exemplarily shown and described, comprises totalizing means for registering results from a plurality of the original meters.

As so embodied, there is included a plurality of relays 40, 40ª, 40ᵇ, that is, one for each of three original meters, and corresponding controlling circuits. The ultimate indicating or registering device is indicated generally at 41, and, as shown, it has hands and dials, or other visual indicating means 42, visible through glass or other transparent part 43 of the instrument casing 44.

In connection with the feature of the invention whereby measurements of a plurality of original metering instruments are sequentially and non-interferingly indicated, devices are provided which are set by the respective relays corresponding to the respective primary metering devices, in response to the circuit control already described, and there are also provided positively-driven means for effecting the sequential and non-interfering ultimate registration of such setting.

As embodied, each relay has a coil 53 and an armature 54 and cooperating therewith an armature 55, which is loosely pivotally mounted at 56 upon a shaft 57, suitably journaled in the frame. When in deenergized position, the armature rests on a stop 52 on the frame. Fixed on shaft 57 is a ratchet wheel 58 for each of the relay units already described. A pawl-like spring 59 is fixed to the rear end of each armature 55 beyond its pivot, and has formed therein an internal aperture, into which the periphery of the ratchet wheel 58 projects slightly, and the front end of the spring beyond the aperture acts as a pawl tooth upon the ratchet wheel.

The shaft 57 is thus capacitated to be actuated for a small portion of a rotation from any of the ratchet wheels 58 at suitable times as will be later described. Shaft 57 has preferably direct driving connections to the ultimate registering or other metering device, and as shown, a bevel gear 63 is fixed to the lower end of said shaft, and meshes with a bevel gear 64 fixed on a shaft 65, journaled at 66 and 67 on the frame. A gear wheel 68 is fixed on shaft 65 and connects to the ultimate registering or metering mechanism 41.

Referring now in detail to the mechanism for sequentially and non-interferingly actuating shaft 57 in responsive correspondence to the settings of the relay units, a shaft 70 is provided, mounted in suitable bearings 71 on the frame, and is preferably continuously driven clockwise, as shown in Fig. 4, by any suitable means. For this purpose there is provided a Ferraris motor 72, the disc 73 of which is mounted on a shaft 74, having bearing 75 and 76 in the frame. Fixed to the shaft 74 is a pinion 77, meshing with a gear wheel 78, fixed on the shaft 70.

For each of the units already described, comprising a relay armature, and ratchet-wheel mechanism, there is correspondingly fixedly mounted on shaft 70 a disc 79, having formed therein an arcuate slot 80 of relatively small dimensions. Loosely mounted on shaft 70 for each of the discs 79 is a one-tooth disc 83, having a tooth 84 adapted to engage with the corresponding armature 55. A coil spring 85 is in tension between the disc 83 and a collar 86 fixed on shaft 70. Fixed to disc 83 is a pin 88, which projects into the slot 80 on the corresponding fixedly-mounted disc 79, the spring tending to hold the pin against the forward end of the slot.

The manner of operation of the mechanism just described is substantially as follows:—

Assuming that the exemplary mechanism of Figs. 3 and 4 is a totalizing register, connected by respective circuits with three original meter devices, such as shown in Figs. 1 and 2, the registering operation of one of these devices will be considered. When the circuit is closed by the meter at contacts 18 and 19, the corresponding relay 40, 40$^a$ or 40$^b$ is energized, and the corresponding armature 55 is swung in clockwise direction, and its pawl 59 moves forwardly on its ratchet wheel 58, and thereby gains one or more teeth on the wheel.

The residual magnetism of the coil will hold the armature 55, until the tooth 84 on the corresponding disc 83, which is positively driven by shaft 70, engages the armature and drives it back against its stop pin 52, and thereby rotates ratchet wheel 58 an absolutely definite predetermined distance, and effects a corresponding registration in the ultimate registering device. The other ratchet wheels on shaft 57, during this operation, will rotate idly under their pawls.

The teeth 84 on the respective discs 83 are in different positions angularly about shaft 70, so that the respective armatures 55 will be sequentially and not simultaneously operated. In the event that any one of the relays should be energized just as its actuating tooth 84 comes into actuating position, the power of the relay magnet is sufficiently greater than the spring 85 so that disc 83 will yield until pin 88 reaches the rear of its slot 80, at which time the magnet will have made the full setting of the pawl 59, and the ultimate registration will be nevertheless accurate.

The relay controlling circuits, having only the light duty of setting the armatures, may carry a very small current, and the contacts and actuating mechanisms therefor may be correspondingly small. This puts but an exceedingly slight additional burden on the original meters, and has practically no tendency to unfavorably affect their accuracy of operation. The actual ultimate registering as precedingly described is effected through a separate circuit for the Ferraris motor or equivalent device.

From all the foregoing it will be understood that a mechanism has been provided embodying the inventive features and resulting advantages set forth, together with others.

What I claim is:—

1. The combination with a plurality of meters, of a summation register having a driving shaft, a plurality of ratchet wheels and their ratchets corresponding to said meters, electro-magnetic ratchet setting means for each meter, and common continuously operating means for causing any set ratchet to actuate its ratchet wheel.

2. The combination with a plurality of meters, of a summation register having a driving shaft, a plurality of ratchet wheels and their ratchets corresponding to said meters, electro-magnetic ratchet setting means for each meter, and common means for causing any set ratchet to actuate its ratchet wheel non-simultaneously with the actuation of any other ratchet.

3. The combination with a plurality of meters, of a summation register having a driving shaft, a plurality of ratchet wheels and their ratchets corresponding to said meters, electro-magnetic ratchet setting means for each meter, a motor and a shaft rotated thereby, and ratchet actuating means corresponding to the respective ratchets and spaced apart angularly about said shaft.

4. In a summation meter, a plurality of ratchets, each adapted to operate a common register, independently operable means for setting each ratchet in operative position and a continuously rotating member to actuate the set ratchets.

5. In a summation meter having a register, a plurality of independently operable register actuating means, a rotatable shaft adjacent to said actuating means for sequentially operating said actuating means, and means for selectively rendering said register operating means operable.

6. In a summation meter, the combination of a register, a pair of rotatable shafts parallel to each other, one of said shafts being connected with the register, means for continuously driving the other shaft, a plurality of normally inoperative means for transmitting rotation of the continuously driven shaft to the first shaft said means being brought sequentially into operation when operative, and means for selectively rendering any of said transmitting means operative.

7. A summation meter including in combination, a summation register, a continuously rotating driving shaft, a plurality of sequentially operating means for mechanically transmitting rotation of the driving shaft to the register and a plurality of individually controlled means for controlling the transmission of rotation to the register.

8. A summation meter system including in combination a plurality of meters, and a summation meter including a summation register, a continuously rotating driving shaft, a plurality of sequentially operating means for mechanically transmitting rotation of the driving shaft to the register to actuate the register, a plurality of means for controlling the actuation of the register and means controlled by the first named meters for selectively operating the controlling means.

In testimony whereof, I have signed my name to this specification.

WILLI BEUSCH.